United States Patent [19]
Duerksen

[11] 3,806,160
[45] Apr. 23, 1974

[54] VEHICLE WITH AUTOMATICALLY REVERSIBLE FOUR WHEEL STEERING

[75] Inventor: Arnold Duerksen, Salinas, Calif.

[73] Assignee: Cochran Western Corporation, Salinas, Calif.

[22] Filed: Nov. 29, 1972

[21] Appl. No.: 310,208

[52] U.S. Cl.................... 280/444, 180/99, 280/408
[51] Int. Cl........................ B62d 13/06, B62d 53/00
[58] Field of Search ............ 280/444, 445, 99, 103, 280/419, 408; 180/79.2 B, 79.2 C, 99

[56] References Cited
UNITED STATES PATENTS

| | | | |
|---|---|---|---|
| 3,637,236 | 1/1973 | Shimosi............................... | 280/419 |
| 3,620,549 | 11/1971 | Miller................................ | 280/445 |
| 1,308,476 | 7/1919 | Byron................................ | 280/445 |
| 1,160,499 | 11/1915 | Fageol............................... | 280/444 |

Primary Examiner—Leo Friaglia
Assistant Examiner—Randall A. Schrecengest
Attorney, Agent, or Firm—Flehr, Hohbach, Test, Albritton & Herbert

[57] ABSTRACT

A vehicular trailer construction provided with automatically reversible four wheel Ackerman type steering whereby a train of the trailer vehicles can be maneuvered in controlled fashion through the tow bar of the trailer vehicle at either end of the train. Each trailer vehicle has equivalent steering mechanisms at each end, reversibly connected to one another to provide lead and trailing steering functions depending on the direction of movement. The reversible steering function is achieved through independent pivoting of the tow bar and steering control at each end of the trailer about a common pivot, and use of cooperatively controlled clamp means to lock the tow bar and steering control at one end to co-linear pivotal movements about the pivot, while simultaneously opening the clamp means at the opposite end of the trailer to free the tow bar and steering control for independent or trailing functions. The reversible steering makes it possible to tow any number of trailers in a train and, after stopping, to reverse the train with steering achieved entirely through the towing bar of the reversing lead trailer. Steering of the train of trailers around corners and obstacles and through U turns is thereby easily accomplished.

11 Claims, 5 Drawing Figures

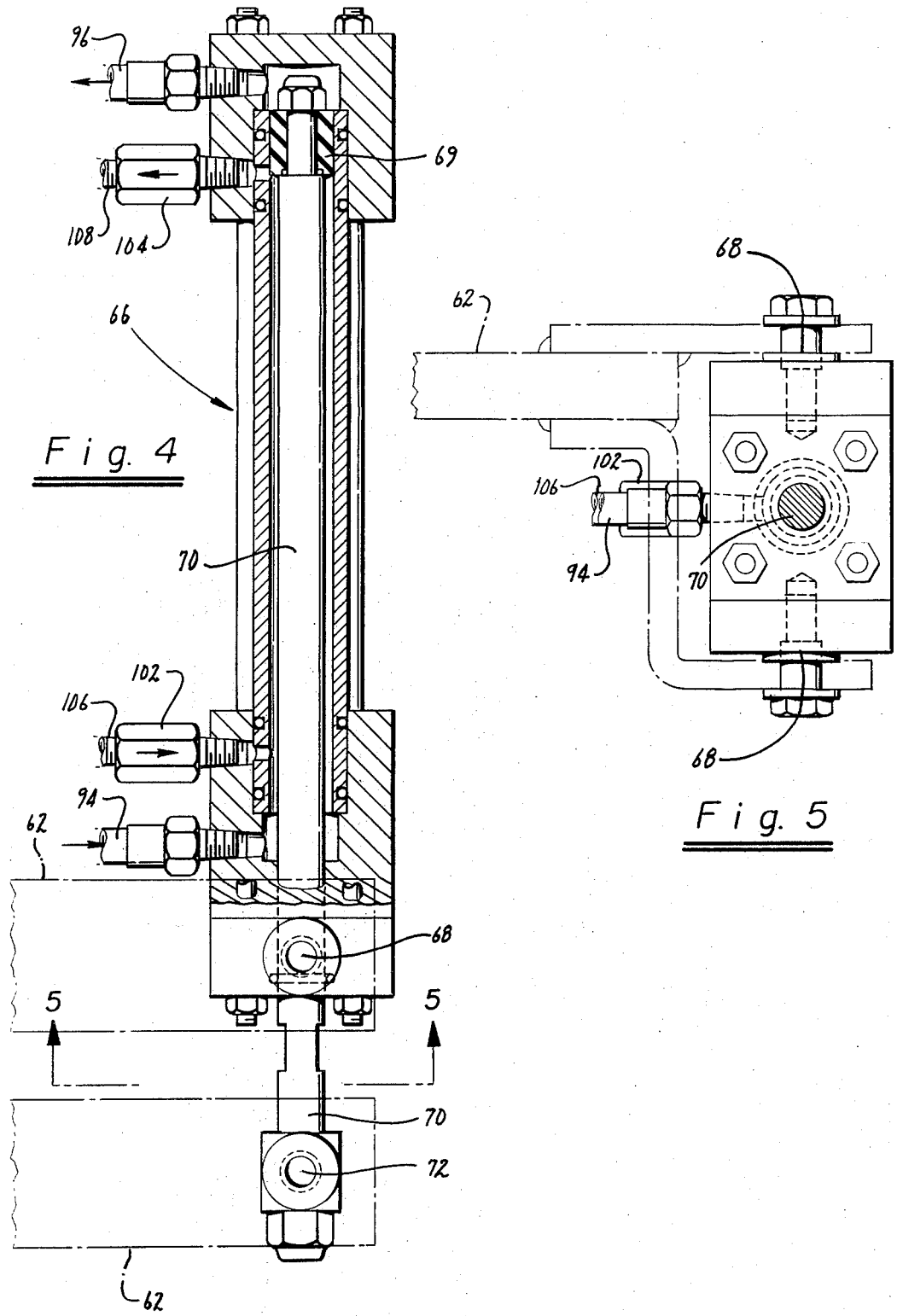

VEHICLE WITH AUTOMATICALLY REVERSIBLE FOUR WHEEL STEERING

BACKGROUND OF INVENTION

Various arrangements have heretofore been utilized for moving trailer vehicles in towed fashion, particularly in ground support equipment for aircraft. Generally, such trailers are towed in a trailing fashion in a "train" relative to the towing vehicle. Such operations are easily accomplished in the forward direction. However, it frequently occurs that the tractor and its train of trailers must be stopped and backed up or operated in the reverse direction to avoid obstacles or to change direction for various reasons. In such circumstances, the driver of the tractor is confronted with a difficult problem particularly as no satisfactory system has so far been devised for automatically providing for a reverse tracking operation.

It will be appreciated that the capacity to operate a train of trailers in opposite directions would be of particular benefit in airport baggage loading operations. Heretofore, following the loading or unloading of a train of trailer vehicles with respect to a cargo ramp or the baggage compartment of an aircraft, difficulty has been encountered in backing the trailer away from the loading point, or in otherwise maneuvering the trailer train in close surroundings in baggage loading operations. Accordingly, the provision of a train of trailers that can be readily towed or pushed from either end, and which will track in desired manner throughout such maneuvers, is highly to be desired.

SUMMARY OF THE INVENTION

This invention relates generally to the field of towable vehicles, and more particularly to trailer vehicles which may be coupled for effective towing or pushing in either of two opposite directions of travel. It specifically relates to ground support vehicles for use with aircraft wherein it is possible to automatically achieve four wheel steering with respect to one or more trailers in a train of trailers.

In general, it is an object of the present invention to provide an improved vehicular trailer construction for the purpose described.

It is another object of the invention to provide a vehicular trailer construction provided with an automatically reversible four wheel steering system whereby it is possible to move a train of such trailers in reversible directions, with the entire train of trailers automatically following the leader.

It is yet another object of the invention to provide a train of trailer vehicles which can be moved in one direction and then reversed, and wherein the steering control for each trailer is determined by the direction of movement of the train.

A particular object of the invention is to provide a reversible four wheel Ackerman type steering system for a trailer vehicle, wherein the steering function is automatically derived only from the direction of movement.

As a brief statement of the invention, I provide a reversible four wheel steering system in the form of substantially equivalent cooperating two wheel steering mechanisms at each end of a trailer vehicle. Each of the steering mechanisms includes separate towing bar and steering control members, pivotally mounted for independent movements about a common connecting pin or pivot axis, and clamp means to lock and hold the towing bar and steering control members in colinear pivotal movements about the common pivot axis. Means responsive to the direction of movement of the trailer vehicle, sensed at one of the wheels, functions substantially simultaneously to close the clamp means at the towed end and to open the clamp means at the trailing end of the trailer so that the tow bar and steering means at the towing end are locked in a steering relationship whereas such members at the trailing end are free to pivot independently in a trailing operation. In a preferred embodiment, such means responsive to the direction of movement of the trailer comprise a reversible rotary pump in a closed hydraulic system, such pump functioning to reversibly operate cylinder means for the respective clamp means.

Other features and advantages of the invention will be apparent from the following description taken in conjunction with the drawings.

BRIEF DESCRIPTION OF THE DRAWINGS

FIG. 4 is an enlarged detail view, with parts in section, of the cylinder mechanism enclosed within line 4—4 of FIG. 1.

FIG. 5 is a view in section along the line 5—5 of FIG. 4.

DESCRIPTION OF THE PREFERRED EMBODIMENTS

Figure 1:
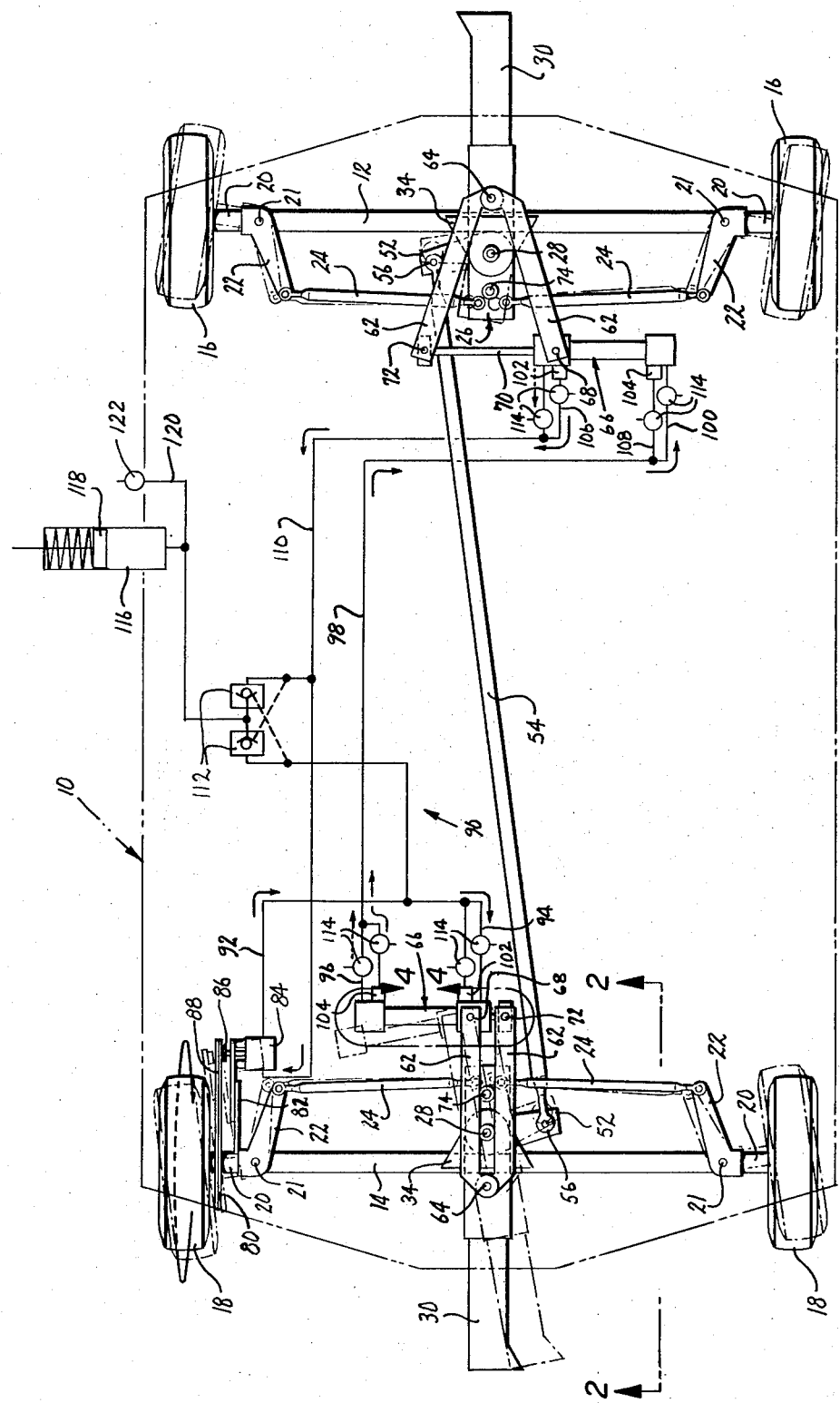
FIG. 1 is a plan view of a steering system for a vehicular trailer construction in accordance with the present invention.

FIG. 1 generally represents a trailer vehicle including a chassis 10 supported by axles 12 and 14 for separate pairs of ground engaging wheels 16 and 18. Utilizing conventional Ackerman type steering, each pair of wheels is mounted on stub axles 20 for steerable movements about kingpins 21, in response to pivoting of track arms 22. The latter are pivotally connected to and responsive to movements of track rods 24 which, in turn, are pivotally connected to a steering control arm 26. In accordance with the invention, each control arm is mounted for pivotal steering movements about a connecting pin 28 carried by the axle of cross member 12 (see FIG. 3). Tow bars 30 at each end of the trailer vehicle are likewise mounted for pivotal movements about the connecting pins 28, which form common pivot axes for the steering control members and tow bars at each end of the vehicle.

Figure 2:
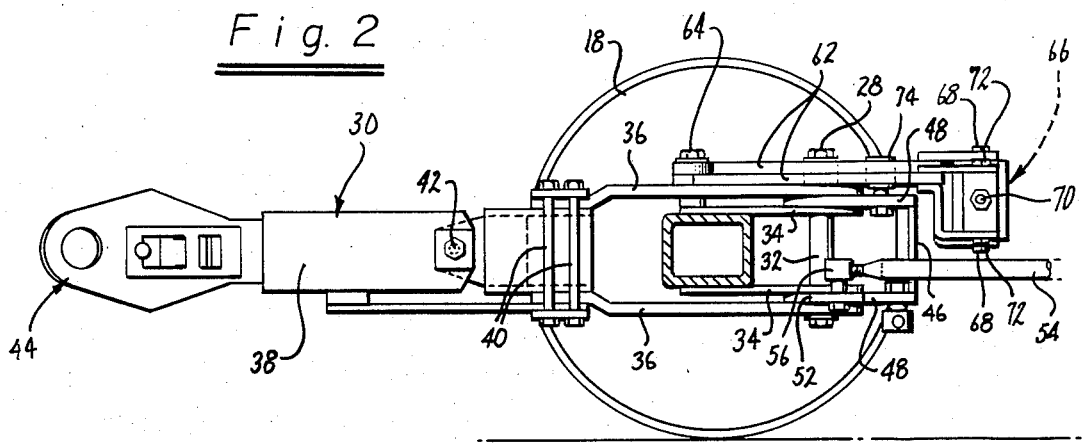
FIG. 2 is an enlarged sectional view along the line 2—2 of FIG. 1.
Figure 3:
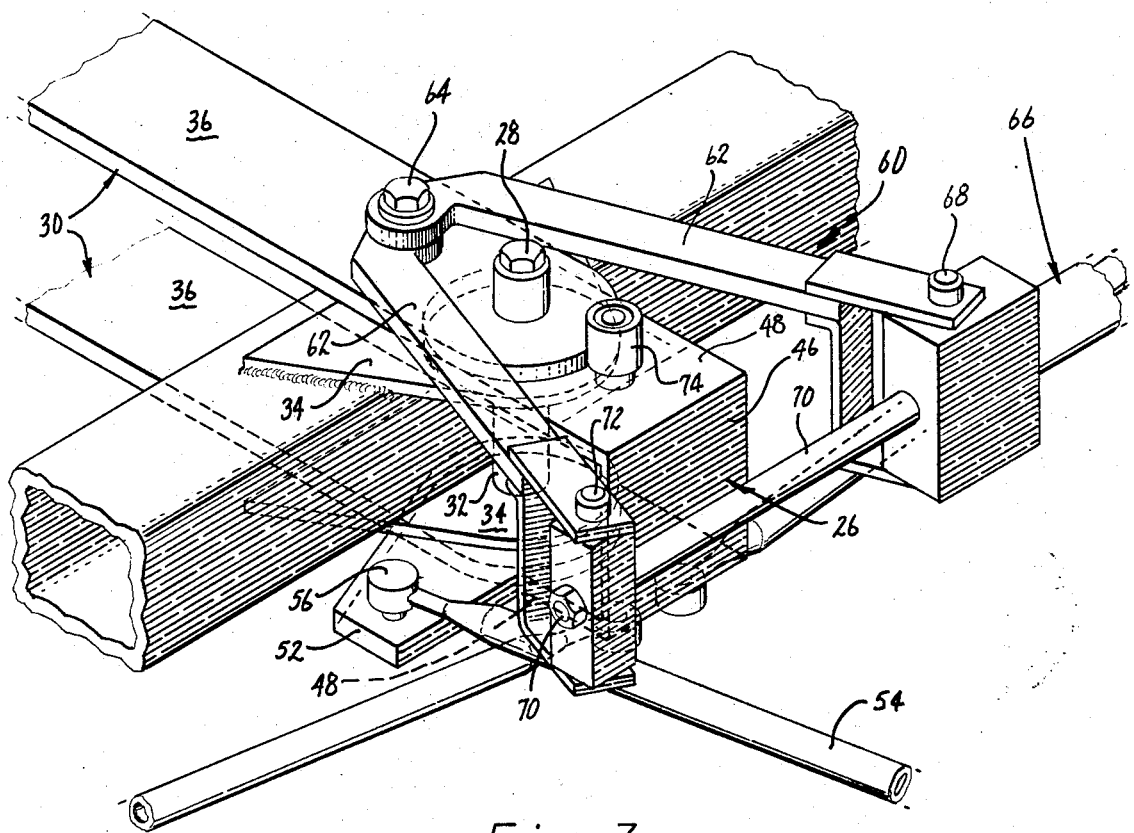
FIG. 3 is an enlarged detail view in perspective, illustrating features of the steering mechanism.

Referring specifically to FIGS. 2 and 3, it will be seen that the connecting pin 28 is received within a spacing sleeve 32, supported by upper and lower brackets 34 from the cross member 12. Pivotal or steering movements of the tow bars 30 are made possible by a bifurcated construction including upper and lower arms 36 which may be suitably secured to projecting tongue portions 38 of the tow bars, as by bolts 40 and 42. A towing connection 44, adapted to be attached to a tractor vehicle, is also provided.

As previously indicated, the steering control members 26 are mounted for pivotal movements about the connecting pins 28. Thus as illustrated in FIGS. 2 and 3, each such member may comprise a U-shaped bracket 46 wherein apertured pivot arms 48 are sandwiched between the support brackets 34 and tow bar arms 36. The separate track rods 24 are pivotally connected at 50 to the U-shaped bracket 46, and respond to pivotal movements of the steering control member to pivot the wheels about their individual kingpins 21. As particularly shown in FIG. 3, the lower arm 48 of the steering control member is provided with a crank extension 52 which provides a means to pivotally attach the longitudinally extending connecting rod 54, as at 56. In general, the connecting rod 54 provides a means linking the steering control members 26 at each end of the vehicle for the separate pairs of steerable wheels 16 and 18.

Since the tow bar 30 and steering control member 26 at each end of the trailer vehicle are mounted for independent pivotal movements about the connecting pin 28, clamp means 60 are provided to lock these members for co-linear pivotal movements about the connecting pin, to thereby provide a positive steering action through the tow bar. In the illustrated apparatus, the clamp means 60 includes a pair of clamp arms 62 pivotally mounted on the upper bifurcated arm 36 of the tow bar by means of the pivot connection 64. Movements of the clamp arms 62, between an open unlocked position (FIG. 3) and a closed locked position (left end FIG. 1) are controlled by the clamp cylinders 66. Thus, as illustrated in FIG. 3, the lead end of the clamp cylinder is pivotally secured to the free end of one of the clamp arms 62, as at 68, whereas the free end of the other clamp arm 62 is pivotally attached to the piston rod 70 of the clamp cylinder, as at 72. It will be appreciated that the pivotal connections 64, 68 and 72 permit actuation of the clamp means 60 to open or close the clamp arms 62 at virtually any position of the steering control member 26 or tow bar 30.

Locking of the steering control member 26 for co-linear movements with the tow bar 30 is accomplished in the closed position of the clamping means 60 by means of a guide extension 74 fixedly mounted on the upper arm 48 of the steering control member 26. The guide extension 74, which preferably is in the form of an antifriction roller, is positioned on an opposite side of the connecting pin 28 from the pivot mount 64, and between the extending clamp arms 62. Upon closing the clamp means 60, the guide means 74 will be engaged by one of the clamp arms and pivoted to a position of co-linearity or alignment with the clamp pivot axis 64 and the connecting pin 28. As a consequence, subsequent movements of the guide member 74 and steering control member 26, about the connecting pin 28, will be co-linear or in-line with the longitudinal axis of the tow bar 30. This operation is particularly illustrated in the full and dotted line positions of the tow bar 30 and wheels 18, in the left hand portion of FIG. 1. Thus, movement of the tow bar 30 from the full line to the dotted line position causes the guide member 74 to move from the full line to the dotted line position and, as a consequence, causes the steering control member 26 to shift the steerable wheels 18 from the full line to the dotted line position. Such movement would result, for example, if the trailer vehicles were being towed by a tractor vehicle positioned at the left hand side of FIG. 1, pulling the trailer vehicle from right to left as viewed in FIG. 1. In contrast, an open position of the clamp means 60, as in the right hand portions of FIG. 1, permits free pivotal movements of the steering control member 26 and wheels 16, for example in a trailing operation, while permitting free swivelling of the trailer tow bar 30.

It is a feature of the invention that the clamp means at opposite ends of the trailer vehicle are adapted to alternate operation, depending on the direction of movement of the trailer vehicle. Specifically, means are provided to automatically close the clamp means 60 at the towing end of the trailer vehicle and to substantially simultaneously open the clamp means 60 at the opposite or trailing end of the vehicle. Referring to FIG. 1, the means to automatically lock and unlock the clamp means 60 includes a sprocket 80 mounted on any one of the wheels of the trailer. Mounted on the same wheel by means of a bracket 82 is a hydraulic pump 84, also fitted with a sprocket. The pump 84 is made responsive to the direction of rotation of the wheel by means of the roller chain 88, and functions to pump hydraulic fluid through a closed circulatory system (generally represented at 90), with the direction of fluid flow depending solely upon the direction of rotation of the wheel. In this regard, the wheels of the trailer are the only parts which will experience any difference in operation as respects a forward or reverse movement of the trailer.

Referring again to FIG. 1, and assuming a towing operation to move the trailer from right to left, the pump 84 will function to push hydraulic fluid through the line 92 into the hydraulic cylinder 66. The hydraulic fluid enters the cylinder through line 94 and pushes the piston 69 and attached rod 70 to the retracted position (see FIG. 4). As viewed in FIG. 1, this causes the left hand clamp means 60 to close to thereby effect a co-linear steering relation between the tow bar 30 and the steering control member 26. During this operation, hydraulic fluid in front of the piston 69 is evacuated through line 96 and is carried by line 98 into the right hand hydraulic cylinder 66 through line 100. This causes the piston and rod 70 of the right hand cylinder to be pushed into the extended position, illustrated, opening the right hand clamp means 60. As a practical matter, the volumetric displacement of the pump 84 and respective clamp cylinders 66 (as well as the ratio of the drive between the drive and driven sprockets 80 and 86) requires a certain amount of trailer movement (viz., 4 to 8 feet) to effect a complete retraction and extension of the respective clamp cylinders 66. As the towing operation of the trailer continues, it will be appreciated that the hydraulic pump 84 will continue to operate to circulate hydraulic fluid through the system. To accommodate this flow, each clamp cylinder 66 is provided with front and rear flow check valves 102 and 104 which function through associated lines 106 and 108, respectively, to permit free circulation of fluid through the system. Thus, in the condition of the system illustrated in FIG. 1, the fluid is continually diverted from the left hand cylinder 66, through check valve 104 and lines 108 and 98, to maintain the closed position of the left hand clamp means and also the extended position of the right hand clamp means (see arrows FIG. 1). During such operation, the hydraulic fluid returns from the right hand clamp cylinder 66 through the line 110 to the hydraulic pump 84. It will be further appreciated that the differential and volumetric capacity of the hydraulic cylinder 66, between the piston rod end and the closed end, is likewise provided for by the free outflow of fluid through the flow check valves 102 and 104. In general, however, the flow checks function to provide a free circulation of fluid through the cylinders 66, after the piston has reached the end of its particular stroke, without permitting flowback through these check valves on a reverse stroke of the cylinder.

The described hydraulic fluid system readily permits a reversal of operations, for example, upon reversal of direction of movement of the trailer. Thus, assuming that the trailer vehicle is stopped and its movement reversed so that it is moving from left to right in FIG. 1, the hydraulic cylinder 84 will reverse direction and function to reverse the flow of fluid in the lines 92 and 110. The net effect will be a reversal of the previously described operation so that the right hand clamp means will close, following which the left hand clamp means will open. Such reversal of operation results merely from the change of direction of the trailer vehicle. As a result, the tow bar 30 and steering control member 26 at the right hand end of the trailer will be locked for co-linear movements about the connecting pin 28, thus causing the trailer to function as if it were being towed from the right. In like fashion, the left hand clamp means 60 will open to permit free, independent swivelling movements of the steering control member 26 and tow bar 30, so that the left hand end of the trailer will perform appropriate trailing functions. To facilitate effective operation of the hydraulic system, pilot operated check valves 112 may be provided for makeup in fluid volume when required. In like fashion, air vent valves 114 may be provided at the inlet and outlet portions of the cylinder 66, to vent the air out of the hydraulic system at the original charging with fluid. A reservoir 116 for hydraulic fluid, suitably provided with a spring loaded piston 118, also insures the presence of a solid bulk of hydraulic fluid, without air inclusion. Refill line 120 may also be provided with a flow check valve 122, to insure fluid retention in the system while providing for easy recharging of fluid to the system without access to the reservoir 116.

The overall operation of the system, in providing automatically reversible four wheel steering for a trailer vehicle, can now be described as follows:

Each of the described trailer vehicles, as generally represented in FIG. 1, is equipped with a towing bar 30 and steering control member 26, at each end. Assuming movement of the trailer vehicle in a longitudinal direction so that one end of the trailer becomes a leading or towed end and the other a rear or trailing end, the tow bar 30 at the lead end automatically becomes rigid with the steering control member 26, through a closing, locking action of the clamp means 60. Substantially simultaneously, the tow bar 30 and steering control member 26 at the rear or trailing end become free for independent swivelling movements about their connecting pin 28. Such operation occurs through action of the hydraulic pump 84 carried by one of the wheels of the trailer. As illustrated in FIG. 1, the hydraulic pump 84 is carried on a stub axle 20 by means of the bracket 82 so that the hydraulic pump and its chain drive always remains in alignment with the drive wheel, regardless of steering angle. The pump 84 is connected within a closed hydraulic system in such fashion that it functions to retract the clamp cylinder 66 at the lead or towed end of the vehicle, and to substantially simultaneously extend or open the clamp means 60 at the rear or trailing end of the vehicle. Such operation occurs solely as a function of the direction of fluid flow which, in turn, is determined solely by the direction of rotation of the drive wheel to which the pump is operably connected. Assuming a towing direction to the left in FIG. 1, the hydraulic pump functions to retract the left hand clamp cylinder 66 and to close the left hand clamp means 60 to lock the tow bar 30 in co-linear pivotal relation with respect to the steering control member 26. This rigid steering connection is achieved through operation of the clamp means 60 to engage the upwardly extending roller guide 74 on the steering control member 26, and to bring it into retained alignment with the clamp pivot 64 and the connecting pin 28, as illustrated at the left hand side of FIG. 1. The trailing function is achieved by substantially simultaneous operation of the hydraulic system to extend the right hand clamp cylinder 66 to open the right hand clamp means 60, as also shown in FIG. 1. In the open position of the right hand clamp means 60, the guide extension 74 is unrestrained, thus permitting the steering control member 26 to freely swivel about the connecting pin 28. The rear or trailing wheels 16 are thus free to track in trailing fashion within the limits of movement permitted the steering control member 26. In like fashion, the trailing tow bar 30 is free to swivel about the connecting pin 28, as necessary and desirable for a trailing operation.

In a coupled train of trailer vehicles, as generally represented in FIG. 1, each trailing vehicle will function in the same manner so that the tow bar becomes rigid with the steering control member at the lead or towed end of the trailer, whereas the tow bar and steering control members at the trailing end are free to pivotally swivel about the common connecting pin. As a result, successive trailer vehicles will track each other in essentially perfect fashion, with the free swivelling tow bar at the trailing end providing towing direction to a rigidly co-linear tow bar and steering control combination in a following trailer. The automatically reversible character of the four wheel steering, composed of two wheel steering mechanisms at each end of the trailer vehicle, makes it possible to tow one or any number of trailers in a train, to stop, and to back up in reverse as may be desired. In the reverse trailer operation, the entire train of trailers will follow the new lead trailer (formerly the rear trailer) with tracking characteristics equivalent to that in the original forward or towed direction. In other words, the reverse pushing of the trailer train will cause the new lead trailer to function as the steering end and the new rear trailer to function as the trailing end, such operation occurring automatically through mere reversal of direction. The operator, by visually steering the tow bar on the reversing lead trailer, can effectively direct the entire train of trailers in a desired direction in the reversed operation. Thus, whether going forward or reversing, the operator need only steer the tow tongue on the lead trailer to insure that the entire train of trailers will effectively track around corners or obstacles, or through 180° turns to effect a U turn. If desired, the train of trailers can be towed from one end, the train stopped, and the towed vehicle disconnected from the trailer train and reconnected to the opposite end of the trailer train for reverse towing of the trailers. In all such maneuvers, the trailers will track each other substantially perfectly, and the tow bar re-orientation between trailers will be accomplished automatically without any need for manual operation of levers, auxiliary mechanisms, and the like. Moreover, in all such operations, power for steering control is derived directly from the direction of movement of the trailer train itself, rather than by means of some complicated power take-off from the towing vehicle.

To those skilled in the art to which the present invention pertains, many variations in structure and in the application of the invention will suggest themselves without departing from the spirit and scope of the invention. For example, although the illustrated clamp means 60 employs but a single pivot 64 for the arms 62, separate spaced apart pivots for arms 62 can be employed with equal success. In such case, the spacing is sufficient to insure effective grasping of the connecting pin 28 and guide projection 74 in aligned relationship. In like fashion, the main pivot for the clamping means 60 is shown as originating on the tow bar 30, with the guide member on the steering control member 26 being locked into co-linear relationship therewith. As an alternative, the main pivot for the clamping mechanisms might be repositioned on the steering control member and the guide element alternatively positioned on the tow bar, without loss of advantage or material change in the concept of the invention as herein described. These and other variations are clearly within the scope of the invention disclosed herein, which is not limited to the specific embodiment herein illustrated and described.

I claim:

1. In a vehicular construction, means to automatically achieve reversible four wheel steering, said means comprising: substantially equivalent two wheel steering mechanisms at each end of said vehicle; each of said substantially equivalent steering means including tow bar means and steering control means mounted for independent pivotal movements about a common pivot axis, clamp means to lock the tow bar means and steering control means to co-linear pivotal movements about said common pivot axis, and cylinder means to actuate said clamp means between closed locked positions and open unlocked positions; means responsive to the direction of movement of said vehicle to actuate said respective cylinder means substantially simultaneously to close the clamp means at one end of the vehicle and to open the clamp means at the other end of said vehicle; whereby the closed clamp means automatically provides a steering function to its two wheel steering mechanism whereas the open clamp means automatically facilitates a trailing function for its two wheel steering mechanism; and means linking the steering control means of said substantially equivalent two wheel steering mechanisms to provide four wheel steering.

2. A vehicular construction as in claim 1 wherein each of said common pivot axes is a vertical connecting pin.

3. A vehicular construction as in claim 2 wherein each of said respective clamp means is bifurcated in construction, and mounted to pivotally grasp in the closed locked position, both said vertical connecting pin and projecting guide means on one of said tow bar means or steering control means.

4. A vehicular construction as in claim 3 wherein said clamp means is mounted on said tow bar means and said projecting guide means is located on said steering control means.

5. A vehicular construction as in claim 3 wherein said projecting guide means is rotatably mounted and functions as an anti-friction device with respect to said clamp means.

6. A vehicular construction as in claim 1 wherein said means linking said steering control means includes crank means on each of said steering control means and connecting rod means pivotally connecting therebetween.

7. A vehicular construction as in claim 1 wherein said means responsive to the direction of movement of said vehicle comprises a closed fluid system, a reversible fluid pump in said system, means connecting said fluid pump to one of the wheels of said vehicle to respond to reversible operations thereof, and means reversibly connecting said closed fluid system to the respective cylinders for the clamp means of said respective two wheel steering mechanisms.

8. A vehicular construction having automatically reversible four wheel steering comprising, in combination: pairs of wheels pivotally mounted on stub axles at each end of said vehicle; a vertical connecting pin mounted at each end of said vehicle; a first steering mechanism at one end of said vehicle including steering control means for one of said pair of wheels mounted for independent pivotal movements about one of said connecting pins, tow bar means also mounted for independent pivotal movements about said one connecting pin, bifurcated clamp means to lock said tow bar means and steering control means to co-linear pivotal movements about said one connecting pin, and first cylinder means to actuate the clamp means of said first steering mechanism; a second steering mechanism including steering control means for the other of said pair of wheels mounted for independent pivotal movements about the other of said connecting pins, tow bar means connected for independent pivotal movements about said other connecting pin, bifurcated clamp means to lock the tow bar means and steering control means of said second steering mechanism to co-linear pivotal movements about said other connecting pin, and second cylinder means to actuate the clamp means of said second steering mechanism; hydraulic means responsive to the direction of rotation of one of said wheels to reversibly actuate said first and second cylinder means to close the clamp means at one end of said vehicle and to open the clamp means at the other end of said vehicle; whereby the closed clamp means automatically imparts a steering function to one pair of wheels whereas the open clamp means automatically imparts a trailing function to the other pair of wheels; and means linking the steering control means of said first and second steering mechanisms to achieve four wheel steering for said vehicle.

9. A vehicular construction as in claim 8 wherein said hydraulic means includes reversible pump means mechanically linked to said one wheel, and adapted to reverse the flow of fluid in said hydraulic system in response to a reversed direction of rotation of said wheel.

10. In a train of coupled trailer vehicles adapted to be drawn by a tractor vehicle, each trailer being of four wheeled vehicular construction with pairs of steerable wheels at each end: substantially equivalent two-wheeled steering mechanisms at each end of each of said trailer vehicles, each of said substantially equivalent steering means including tow bar means and steering control means mounted for independent pivotal movements about a connecting pin, clamp means movable to lock the tow bar means and steering control means to colinear pivotal movements about a connecting pin, and cylinder means to actuate the clamp means between closed locked positions and open unlocked positions; means responsive to the direction of movement of the trailer vehicle to reversibly actuate the cylinders for the steering mechanisms at opposite ends of the trailer vehicle to thereby close the clamp means at the drawn end of the trailer vehicle and open the clamp means at the trailing end of the trailer vehicle, whereby the steering mechanisms for each trailer vehicle cooperate to provide corresponding steering and trailing functions in response to the direction of movement of the train of trailer vehicles; and means linking the steering control mechanisms at each end of a trailer vehicle to one another.

11. A train of coupled trailer vehicles as in claim 10 wherein means are provided to link the tow bar means of each adjacent trailer vehicle, whereby the steering mechanisms of the trailing pair of wheels of one trailer vehicle provides a steering function to the steering mechanism of the leading pair of wheels of an adjacent trailer vehicle.

* * * * *